Patented Apr. 3, 1945

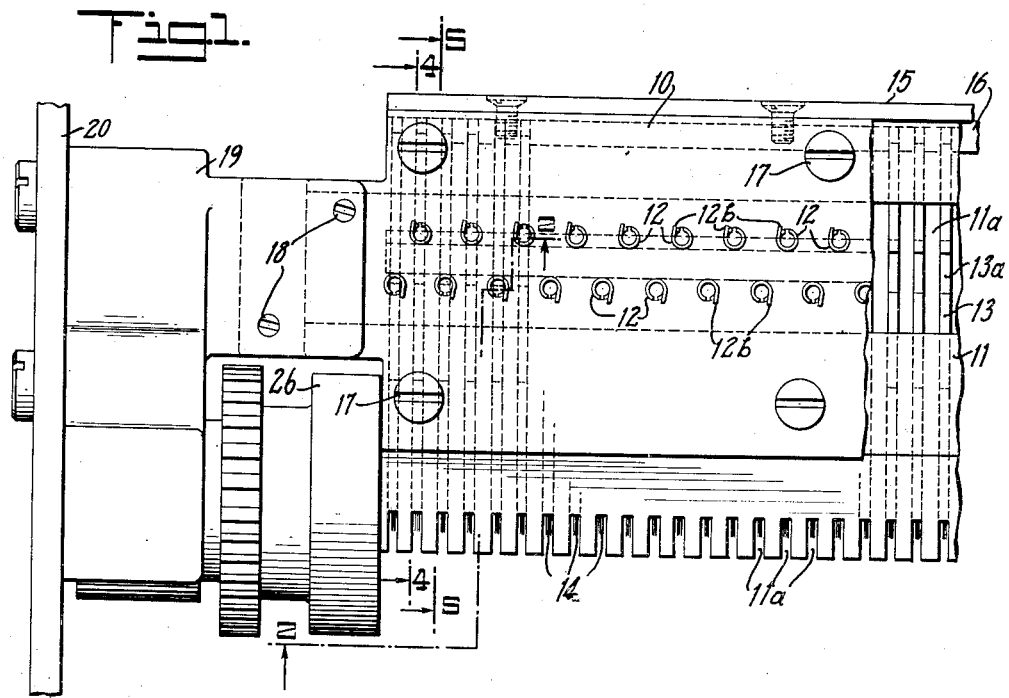
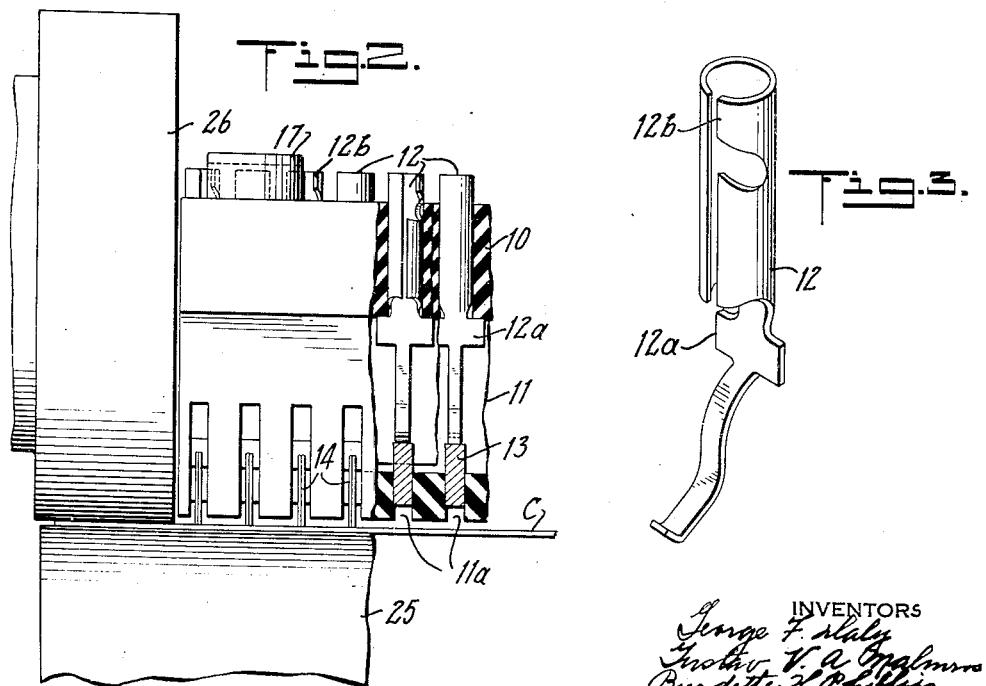

2,372,882

UNITED STATES PATENT OFFICE 2,372,882

CARD SENSING MACHINE

George F. Daly, Endicott, Gustav V. A. Malmros, Binghamton, and Burdette H. Phillips, Endicott, N. Y., assignors to International Business Machines Corporation, New York, N. Y., a corporation of New York Application December 23, 1941, Serial No. 424,168

1 Claim. (Cl. 200—46)

This invention relates to sensing means for data designating perforations in records.

The records may be used in accounting, sorting, transcribing, transmitting and other record-controlled machines. One example of a record-controlled machine is shown in Patent No. 2,120,233. There the sensing means is shown in Fig. 2 and comprises conductive brushes and a common contact roll. The record is continuously fed between the brushes and contact roll. When a brush encounters a perforation in the record, it engages the contact roll to establish an analyzing circuit. The record has parallel columns, each sensed by one of the brushes. Each record column has differentially disposed index positions perforated according to a chosen code to designate control and character data. As the record is sensed while in motion, the data perforations in a column are sensed by a brush at differential timed intervals of a cycle, and this differential timing determines the significance of the designating perforation. The brushes are usually made of wire bristles and supported to flex in the direction of feed of the records.

The present invention is particularly concerned with improvements on a sensing means such as discussed above in connection with the mentioned patent, but the objects of the invention embrace improvements in electrical sensing structures generally, i. e., for sensing any type of record or record card designating control and character data and for sensing records at rest as well as in motion.

One difficulty with electrical sensing means is to maintain the brush tips as they wear, in effective contact with the common contact member through a perforation; that is to maintain positive sensing engagement of the brush tips with the record designations. Another difficulty is to maintain the brush tips, as they wear, in effective sensing relation to the index positions of the record in analyzing position. Still another difficulty is to prevent lint rubbed from the record by the brush tips and dirt particles from accumulating under the brush tips to break their electrical sensing power.

The general object of the present invention is to overcome the above difficulties.

More specifically, an object is to provide a novel brush structure so supported as to maintain positive sensing engagement of the brush tips with a record in spite of considerable wear of the brush tips.

Another object is to so support the brush structures that the tips will remain in effective sensing relation to the index positions of the record column in spite of wear of the brushes.

Another object is to so construct said brush structure as to prevent accumulation of grit and lint under the brush tips.

Another object is to provide novel mounting and carrying means for the brush structures.

Another object is to provide novel spring terminal elements for the brush structures and means for mounting these elements.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a plan view of an end portion of the brush assembly, with the parts shown about twice actual size.

Fig. 2 is a broken sectional view taken generally along lines 2—2 of Fig. 1, with the parts about four times actual size.

Figure 4:
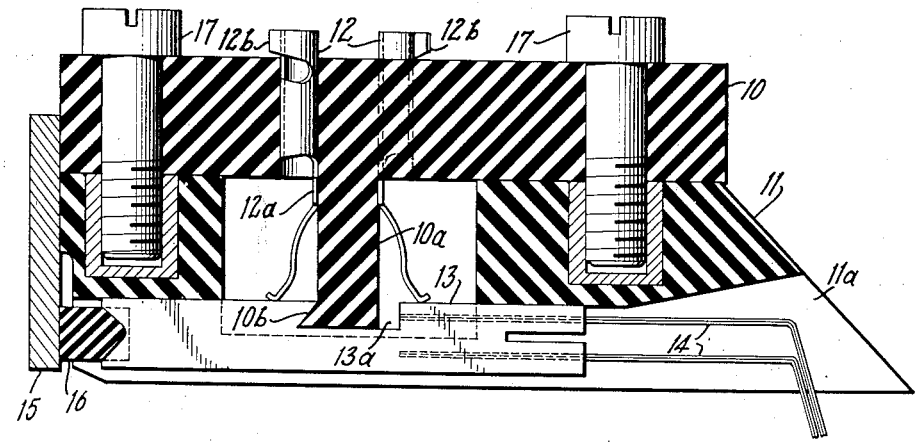
Figure 5:
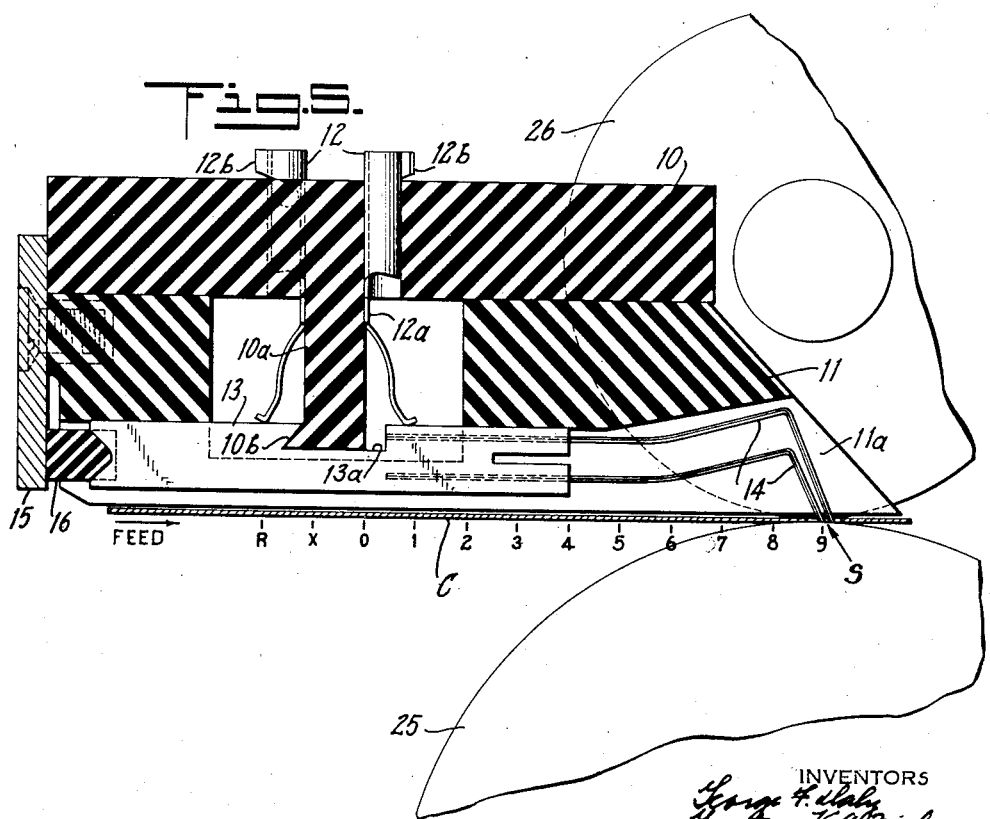

Fig. 3 is a detail, greatly enlarged perspective of a spring terminal element, and Figs. 4 and 5 are sections along lines 4—4 and 5—5 of Fig. 1 and on the same scale as Fig. 2.

The analyzing or sensing means comprises upper and lower blocks 10 and 11 of insulating material. Block 10 has a dependent leg 10a formed with an inclined toe 10b. Block 11 is in effect, a comb bar open at the top to receive the leg 10a and formed at the bottom with narrow, parallel slots 11a extending from front to rear and continuous intermediately with the opening in the upper portion of the block. Block 10 has two rows of holes for receiving the hollow round upper portions of spring terminal elements 12. Each such element has an intermediate flat portion with lateral tabs 12a and has a lower bent end to engage the upper edge of a brush holder 13. This holder is of metal cast around the rear portions of wires forming the sensing brush proper, designated 14. The brush is thus anchored to the holder and together with it constitutes a brush structure. A bar 15 is attached to the rear of comb bar 11. Suitably fixed to the bar 15 is a soft rubber bar 16 which projects into and fits into notches cut in the backs of the walls of slots 11a and also projects into the slots.

The brush 14 is composed of two tufts of wire bristles. Hereinafter, reference to the brush signifies the two tufts of bristles collectively; e. g., the tip of the brush refers to the ends of the two tufts of bristles.

To assemble the parts, block 10 is held bottom up and spring terminal elements 12 inserted in the holes in the block. Block 11 is then placed bottom up on the inverted block 10 and the blocks secured to each other by screws 17. After this has been done, the lugs 12b of elements 12 are bent transversely to one side of the holes in block 10. The lower edge of each lug 12b is inclined so that when the lug is bent transversely, the inclined edge cams against the normally top side of the block 10 to force the element 12 upwardly. The upward movement of the element is limited by engagement of its tab 12a with the bottom of the block 10. The element 12 is thus clamped to block 10 by the lug 12b and the projection or tab 12a. The assembly is then righted and secured at each end by screws 18 to a bracket 19 suitably attached to an end frame 20 in the machine. The terminal elements 12 are prevented by engagement of flat tabs 12a with the vertical flat sides of the leg 10a of block 10 from turning in the holes in block 10. The upper hollow portions of elements 12 are adapted to receive plug tips of wiring (not shown) to connect the brush structures into sensing circuits.

Each brush holder 13 has a notch 13a in its upper edge, the notch being formed with an inclined rear end forming an acute or reentrant angle with the bottom of the notch and having the same inclination as the toe of leg 10a of block 10. The brush structure is insertable in place by moving it into one of the slots 11a and towards the rear against the resistance of rubber strip 15 and then hooking the inclined rear end of its notch 13a over the toe 10b. The rubber strip 16 will then urge the brush structure forwardly, causing the inclined rear end of notch 13a to ride up the toe 10b until the bottom of the toe is flush in engagement with the bottom of the notch. The portion of the strip 16 engaging the rear end of the brush holder 13 remains under compression and holds the brush structure in proper inserted position. The rear end of the brush holder is recessed and the rubber of strip 16 bulges into this recess to assist in preventing displacement of the brush structure. A brush structure may be readily removed by unhooking it from the toe 10b while moving it to the rear against resistance of rubber strip 16 and then moving it down and away.

When a brush structure is inserted in place, the upper edge of its part 13 engages and flexes the lower end of one terminal spring element 12. The adjacent terminal elements 12 of one row engage alternate brush holders 13. By disposing the terminal elements in two rows and staggering the elements engaging with the adjacent brush holders 13, the elements may be spaced apart twice as far as if they were disposed in one row. Thus, the individual terminal elements including tabs 12a may be made wider and stronger by staggering them in two rows.

Fig. 4 shows a brush 14 in unflexed condition, i. e. relieved from engagement with a card or the common contact member 25, here shown as a roller. In this unflexed condition the rear portion of the brush is substantially horizontal and the forward portion is at an incline, with the designation sensing tip of the brush below and to the left of the ideal sensing point designated S in Fig. 5. The ideal sensing point is that position occupied by the brush tip in which it is adapted to have maximum area of engagement with the contact roll 25 through a given perforation in card C at a predetermined differential time of a cycle in which the card is fed past the sensing brush. Thus, in the ideal position of the brush tip, it is adapted to have maximum area of engagement with contact roll 25 through perforations 9, 8, 7—R at corresponding differential times of a cycle. Obviously, the maximum area of engagement of a brush tip with the contact roll is provided when the brush tip rests on the center of the upper semi-circle of the perimeter of the contact roll, as shown in Fig. 5. It will be clear that the parts are so arranged and mounted that initially, as set in the machine, the unworn tip of a brush will be at ideal sensing position. Fig. 5 shows a brush 14 in flexed, operating condition engaging contact roll 25 through a perforation in the card C. The card C is fed in the indicated direction by means including contact roll 25 and a coacting feed roll 26. In its flexed, operating condition, the brush 14 has its tip at the ideal sensing point S. When the brush is brought from inactive, unflexed condition to operative position it flexes as a whole about an approximate point near the anchorage point of the brush. This flexing point is close to the plane of feed of the card and at a distance from the sensing tip of the brush considerably greater than the length of the downwardly inclined forward portion of the brush. Thus, as may be understood from Fig. 5, if a line were drawn from the flexing point of the brush to the brush tip, such line would extend in a direction closely approaching the feed direction of a record. Stated differently, such line would lie at far less inclination to the feed direction than the inclination of the forward portion of the brush to the feed direction. This line is, in effect, the resultant of the upwardly inclined part of the rear leg of the flexed brush and of the forward leg of the brush and is longer than either leg. The brush tip may be considered, when the brush is flexed, as subtending such resultant line and as adapted to pivot about the flexing point of the brush. Thus, the resultant line is, in effect, a radial line between the brush tip and the flexing point. For convenience, such line may be referred to as the effective radial line along which the brush tip lies in relation to the flexing point. Such terminology aptly defines the relation in structure and location between the brush tip and the flexing point when the brush is coacting with the contact roll 25 to sense perforations in a record. Accordingly, as the brush tip wears in continued use, it describes an arc of minimum curvature and extending substantially along a line extending perpendicularly through the sensing point S. Thus, the brush tip as it wears deviates only very slightly from the ideal sensing point. Such deviation is not great enough, even after appreciable wear of the brush tip, to cause the brush tip to fall behind a perforation or designation position of the record when such designation position is at the sensing point. The inclination of the forward part of the brush has a sufficiently large vertical component to enable the bottom of the brush, i. e., the brush tip, to be cut substantially at right angles to the length of the forward motion. This enables the brush tip to be made sufficiently small to confine it to substantially point sensing engagement with only one small perforation in the card at a time even after wear of the brush tip. As usual, the inclination of the forward part of the brush enables the card to advance without interference by the brush.

Were the brush disposed close to the plane of the card feed and not bent down at its forward portion, the brush tip would not make point contact with the contact roll. Further, the brush tip would then have to be cut at a considerable bias to the brush length and would cover too large an area and would not maintain point contact with the contact roll as the brush tip wore. If the brush were inclined along its entire length and flexed in operating condition, the brush tip, as it wore, would describe an arc at a far greater angle to a vertical line passing through sensing point S than is the case with the brush here disclosed. The greater such angle, the more the brush tip departs from the sensing point and the more it loses point contact with the contact roll. It is thus seen that with the angular formation of the brush disclosed herein, the brush tip, as it wears, describes an arc at a minimum angle to the vertical line passing through sensing point S and maintains point contact with the contact roll after long continued usage.

The brush 14 has been discussed as a unit. This brush unit comprises two tufts or groups of bunched wires attached at the rear to brush holder 13. The groups of wires are spaced apart in a vertical direction along their generally horizontally running rear portions. Thus, the flexing point of the upper group is above the flexing point of the lower group of bunched wires and, therefore, the radius of the sensing tips of the upper group with respect to the flexing point is greater than the radius of the tips of the lower group. Accordingly, when the brush is flexed to operating condition from the position shown in Fig. 4 to that shown in Fig. 5, the tips of the upper or outer group of wires move further to the right from unflexed position than the lower or inner group of wires. As a result, the inclined portions including the tips of the outer group of wires are slightly spaced freely away from the inner group of wires. Consequently, if grit and lint are rubbed by the brush wire tips from the record material, they will tend to creep into the space between the wire groups instead of accumulating under them. The brush is thus practically self-cleaning.

While there has been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

Electrical means to sense perforations in a record having a suitable feed direction, comprising a conductive brush having a rear anchorage and composed of a plurality of flexible strands, the brush having a front leg terminating at the free end in a sensing tip for constantly riding on the record while the record is in motion in the feed direction, said sensing tip being comprised of coplanar free ends of said strands, the brush having a rear leg between the anchorage and the front leg, the brush being in flexed condition, when in sensing engagement with the record, with an approximate flexing point located intermediately within its rear leg, the front leg having a forward inclination toward the feed direction but with such vertical component that the coplanar free ends of the strands cover an area of the record substantially equal to the cross-section of the front leg, the rear leg, when the brush is in said flexed condition, being effectively inclined upwardly towards the front leg, said angular relation of the front and rear legs enhancing the pressure of the sensing tip against the record and affording an effective radial line between the sensing tip and the flexing point closely paralleling the feed direction, so that the free ends of the strands as they wear move substantially perpendicular to the feed direction and deviate a minimum amount from a chosen sensing position for a perforation in the record.

GEORGE F. DALY.
GUSTAV V. A. MALMROS.
BURDETTE H. PHILLIPS.